United States Patent [19]

Rhodes

[11] Patent Number: 4,786,301
[45] Date of Patent: Nov. 22, 1988

[54] DESICCANT AIR CONDITIONING SYSTEM

[76] Inventor: Barry V. Rhodes, Route 1, Box 92, Chickamauga, Ga. 30707

[21] Appl. No.: 85,321

[22] Filed: Aug. 10, 1987

Related U.S. Application Data

[63] Continuation of Ser. No. 750,932, Jul. 1, 1985, abandoned.

[51] Int. Cl.$^4$ ............................................. F25D 23/00
[52] U.S. Cl. .......................................... 62/271; 62/92; 55/208
[58] Field of Search ........................................ 55/208

[56] References Cited

U.S. PATENT DOCUMENTS

| | | | |
|---|---|---|---|
| 1,819,643 | 8/1931 | Fleisher | 62/271 X |
| 2,038,071 | 4/1936 | Wilhelm | 55/410 X |
| 2,090,287 | 8/1937 | Cornelius | 62/92 |
| 2,332,975 | 10/1943 | Palmer | 62/92 X |
| 3,296,773 | 1/1967 | Hemstreet | 55/208 |
| 4,430,864 | 2/1984 | Mathiprakasam | 62/94 |
| 4,467,785 | 8/1984 | Langford et al. | 62/92 |

FOREIGN PATENT DOCUMENTS 1039318   2/1984   U.S.S.R. .............. 62/271

OTHER PUBLICATIONS

*Popular Science*, Jul. 1984, "Solar Air Conditioners", E. F. Lindsley, pp. 64-66, 99.

*Primary Examiner*—Henry A. Bennet
*Attorney, Agent, or Firm*—Daniel H. Kane, Jr.

[57] ABSTRACT

A desiccant air conditioning system incorporates a desiccant material structure in the form of a heat exchanging desiccant bed. The heat exchanging desiccant bed is formed by granular desiccant material defining air passageways and liquid circulating channels for circulating heat transfer liquid in heat exchange relationship with the desiccant bed. The desiccant bed may include at least one stack of substantially parallel spaced-apart thermally conducting fins or plates with the granular desiccant material intimately bonded to the surfaces of the plates. The plates are provided by tube sheets or tube fins which include the tubes or channels for circulating heat transfer fluid. The method of air conditioning contemplates drawing building air to be conditioned through an adsorb air passageway; preconditioning the air by initially moisturizing or humidifying the air to substantially 100% relative humidity and adding heat to the moisture-laden air extracted from the air exiting from the desiccant bed. The preconditioned air enhances the ability to export or remove net latent heat and sensible heat energy from the system for better independent control of temperature and humidity. The preconditioned air passes through the heat exchanging desiccant bed for adsorption and condensation of excess water. At the same time cooling liquid circulating through the circulating channels of the desiccant bed exports and removes latent heat of condensation liberated by adsorption on the desiccant surfaces. A final step of evaporative chilling of the dried and cooled air brings the air condition parameters within the desired comfort zone range.

26 Claims, 5 Drawing Sheets

DESICCANT AIR CONDITIONING SYSTEM

This application is a continuation of application Ser. No. 750,932, filed July 1, 1985, now abandoned.

TECHNICAL FIELD

This invention relates to desiccant air conditioning systems for cooling and conditioning air using desiccant materials that adsorb moisture from humid summer air. The air is then subjected to evaporative cooling. Solar energy or other alternative sources of energy may be used to regenerate the desiccant material providing the primary air conditioning energy source. The invention is also applicable to heating systems and for comfort zone air conditioning generally.

BACKGROUND ART

Conventional air conditioning systems rely upon traditional refrigerator cycles in which electrical energy and conventional energy sources power the cooling and conditioning action of a refrigerant through compression and expansion phases of the refrigeration cycle. The rapid spread of conventional residential and commercial air conditioning has created excessive peak load demand during summer days on utility systems particularly in southern climates. As a result, attention has turned to the feasibility of air conditioners which rely on alternative energy sources. Desiccant air conditioning systems are able to utilize alternative energy sources such as solar energy as the ultimate energy source for cooling and air conditioning thereby reducing electric power consumption and reliance upon conventional power sources.

Air conditioning by evaporative cooling has previously been restricted to hot dry climates such as found in the Southwest. Desiccant systems now promise extension of the "swamp cooler" principle of evaporative chilling to hot and humid summer air such as, for example, found in the Southeast and eastern portions of the country. Present desiccant solar air conditioners are described for example in the article, Lindsley, "Solar Air Conditioners", *Popular Science*, July 1984, pp. 64 et seq.

These prior art desiccant solar air conditioners work as follows. During the cooling mode or adsorption cycle, hot humid air enters the intake side of the air conditioning system and passes through one side of a slowly turning desiccant wheel or circular desiccant bed. Water vapor and other moisture vapor is adsorbed on the extended desiccant material surface area, drying the air and releasing the latent heat of condensation. The hot dry air from the desiccant bed wheel then passes through a heat exchanger such as an air to air heat exchanger wheel giving up some of the heat to an exhaust air stream. The air is then reconditioned to have parameters in the desired comfort zone by passing through an evaporative element or unit where moisture is evaporated back into the air, for example by spraying, cooling the air to a desired temperature and humidifying the air to a desired relative humidity.

As the desiccant wheel or other desiccant bed is saturated to capacity with moisture, it is regenerated while rotating through the desorption cycle. Warm air or heated air typically from the attic passes through a solar actuated heat exchanger for further heating to a desired regeneration temperature. Hot fluid circulates in the solar heat exchanger coil from solar collectors. The solar heat exchanger is also referred to as the regeneration coil from which the heated air then passes back through the other side of the rotating desiccant bed or desiccant wheel removing the moisture and drying the desiccant for reuse. A conventional fuel source such as a gas heater may be used as a backup source of energy for recharging or regenerating the desiccant in the absence of adequate solar energy. Typically the system is also available for operation as a heating system in winter by using another solar heating coil or heat exchanger with the solar collectors and blowing solar heated air to appropriate circulating ducts.

A number of disadvantages are attendant upon previous desiccant solar air conditioners. A primary limitation of prior art systems is that temperature change is limited to that available from transformation of sensible heat in the air to latent heat of moisture contained in the air, and transformation of latent heat of moisture back to sensible heat. Thus, air temperature conditioning is subject to the limitations inherent in the substantially closed system of heat exchange between the latent and sensible forms of heat energy. Furthermore, reduction in temperature is associated with increase in humidity frequently above desirable levels of relative humidity, severely limiting simultaneous control of both temperature and relative humidity to desirable levels. As a result it is difficult to achieve air conditioning for domestic or commercial use within desired comfort zones. The close inverse relationship of temperature and humidity in conventional air conditioning systems particularly limits the independent control of humidity which must always increase for a reduction in temperature. As a result a useful desiccant solar air conditioner for the hot and humid southeastern regions of the country still does not exist.

OBJECTS OF THE INVENTION

It is therefore an object of the present invention to provide a new desiccant air conditioning system which is useful in hot and humid climates including the southeastern regions of the United States and which is able to rely on solar energy or other alternative energy sources for cooling and conditioning air with substantial savings in electrical energy and peak load summer demand.

Another object of the invention is to provide a new desiccant air conditioning system which permits a greater degree of independent control of temperature and humidity for achieving parameter levels in desired regions of the comfort zone as set forth for example on psychometric charts and Moliere diagrams.

A further object of the invention is to provide an open system desiccant solar air conditioner with a broad range of application and capable of net introduction of heat energy from external sources and net removal of heat energy relative to the air conditioning system for greater flexibility and control of comfort zone parameters.

Additional objects of the invention are to provide more efficient heat exchange and efficient net import and export of heat energy in the desiccant bed of desiccant air conditioning systems by circulating liquid-to-air and air-to-circulating liquid heat exchange; to obtain more efficient utilization of solar energy or other available energy by providing saturation or supersaturation conditions in the air flow through the desiccant air conditioner; to operate the desiccant bed in more efficient temperature ranges and improve the capacity of the desiccant bed to adsorb and desorb water vapor;

and to implement microprocessor based control and optimization of desiccant air conditioning systems for timed cycling operation, on call operation, or parameter sensing operation.

DISCLOSURE OF THE INVENTION

In order to accomplish these results the present invention provides an improved desiccant air conditioning structure for desiccant air conditioning systems in the form of a heat exchanging desiccant bed. According to the invention the heat exchanging desiccant bed comprises desiccant material such as granular extended surface area desiccant material defining air passageways through the desiccant bed, and fluid circulating channels for circulating heat transfer liquid such as water, aqueous solutions, etc. in heat exchange relationship with the desiccant bed.

In the preferred example embodiments the desiccant bed is formed with a plurality of heat conducting surfaces defining the air passageways with granular desiccant material intimately bonded to the heat conducting surfaces by an adhesive bonding layer which leaves the major portion of the surface area of the desiccant material exposed for contacting air in the air passageways.

According to the new method of the present invention, hot and humid air to be conditioned is first preconditioned as hereafter described and then passes through the air passageways of the desiccant bed for condensation and adsorption of moisture on the extended surface area of the desiccant material during the adsorb cycle. At the same time, a coolant liquid is circulated through the circulating channels in heat exchange relationship with the desiccant bed for efficient removal of latent heat of condensation and adsorption from the desiccant bed and desiccant material during the adsorption cycle.

A feature and advantage of this heat exchanging desiccant bed relationship according to the present invention is that the desiccant air conditioning system becomes an open system which permits substantial import of energy from external sources such as alternative energy sources into the system, and substantial removal of heat energy from the system. Thus, the present invention is not limited in its air conditioning function to exchange of heat within the system between the energy modes of sensible heat in the air and latent heat in the moisture. The present invention can provide a substantial net increase or decrease in sensible and latent heat energy for the air to be conditioned. Furthermore, the continuous removal of heat from the desiccant bed during the adsorption cycle greatly increases the efficiency and rate of air drying or air conditioning.

The method of the present invention also contemplates during the desorb cycle the steps of passing heated air through the desiccant bed for evaporating and removing moisture from the saturated or moisture laden desiccant material while at the same time circulating heated liquid in the circulating channels in heat exchange relationship with the desiccant bed for importing heat from external sources into the system greatly increasing the efficiency and rate of evaporation and regeneration of the desiccant material bed. Between the adsorb and desorb cycles, the desiccant bed is drained of circulating liquid from the previous cycle to conserve heat energy in respective hot and cold tanks storing the respective cooling and heating liquids.

In preferred example embodiments of the solar air conditioning system, the desiccant bed comprises at least one stack of substantially parallel thermally conducting fins or plates. The plates provide first and second surfaces respectively facing the surfaces of adjacent plates in the stack spaced apart to provide air passageways through the desiccant bed between the plates. The plates are typically made of heat conducting metal material such as aluminum and further comprise tubes or channels for circulating heat transfer fluid in heat exchange relationship with the plates for removing or adding heat energy. According to particular examples, tube sheets or tube fins such as for example typically used in solar collectors may be used for the stack of plates in the desiccant bed.

A layer of bonding adhesive is formed over the first and second surfaces of the respective substantially parallel plates and a layer of granular desiccant material such as commercial silica gel is intimately bonded to the surfaces of the respective plates by the layer of bonding adhesive. A major portion of the desiccant material granules are exposed for contacting air passing between the plates.

A feature and advantage of this construction arrangement of the desiccant bed is that the desiccant material is brought into intimate contact with the heat conducting plates for efficient heat exchange relationships throughout the desiccant bed on the one hand with air passing through the air passageways and on the other hand with heat transfer fluid circulating in the circulating channels. The desiccant bed may comprise a plurality of stacks according to the flow rate capacity specified for the desiccant bed.

According to the preferred example embodiments desiccant material of granular size is specified meaning and intending to refer to pieces of desiccant material of whatever shape or configuration larger than powder size. For example, granular desiccant material in the size range of for example 1/32"–¼" (0.08–0.65 cm) is preferable. Thus, the desiccant material comprises granular, pelletized, or crushed pieces in the size range comparable for example to the U.S. Standard or Tyler mesh size of greater than 50 and preferably for example greater than 20 and up to 4 or even greater mesh size. The described example embodiments utilize commercial silica gel, for example in the configuration of spheres or crushed pieces, which provide extended adsorbant surface area. For example, commercial silica gel having pore diameters of average size 22 angstrom units (A°) provides an adsorption surface area of 835 m$^2$/gram of silica gel.

The invention provides a complete air conditioning system constructed and arranged to provide an adsorb cycle for passing air through the desiccant structure for drying the air to be used for evaporative cooling, and a desorb cycle for reactivating the desiccant structure using heat energy such as solar energy. Subsidiary heat exchange closed loops for both the adsorb and desorb cycles are also included in the system to enhance the efficiency of operation. A fan is positioned at the downstream end of the desiccant bed for drawing rather than blowing air through the desiccant bed during the adsorb cycle. The fan is reversible for blowing air back through the desiccant bed during the desorb cycle. An adsorb air or building air passageway communicates with the first and second ends of the desiccant bed through a first set of upstream and downstream louvers operatively positioned in the adsorb air passageway at the respective ends of the dessicant bed for opening to the adsorb air stream and closing to the desorb air stream. A desorb air passageway operatively communicates with the respective ends of the desiccant bed with a second set of upstream and downstream louvers operatively positioned in the desorb air passageway at the respective ends of the dessicant bed. The second set of louvers are oriented in the desorb air passageway for closing and blocking the adsorb air flow through the desorb air passageway during the adsorb cycle. On the other hand, when the fan is reversed for blowing air through the desiccant bed during the desorb cycle, the desorb air flow opens the second set of louvers.

According to an important feature of the invention a spray humidifier or moisturizer is operatively positioned at the inlet end of the adsorb or building air passageway upstream from the desiccant bed, etc., for preconditioning the inlet air by spray cooling the entrant air and bringing the moisture content to substantial saturation or supersaturation and substantially 100% relative humidity. The addition of moisture to the air to be dried and conditioned may at first seem contradictory, but this critical step according to the present invention permits and enhances the transport of heat energy out of the system and out of the air to be conditioned as hereafter described. Upon achieving saturation or supersaturation the substantially 100% relative humidity inlet air before entering the desiccant bed passes according to the invention through a first heat exchanger where heat extracted by a second heat exchanger from air exiting from the desiccant bed is added to the spray cooled moisture-laden air. The heat that is added is removed by the liquid coolant circulating in the desiccant bed. The addition of heat also increases the temperature differential between the air and the circulating coolant thus increasing the efficiency of heat removal. The first and second heat exchangers in the adsorb air passageway form an adsorb closed heat exchange loop.

The prepared adsorb air, preconditioned according to the present invention to facilitate export and removal of heat energy from the system and to increase the efficiency of the air conditioning system, passes through the first or upstream louver of the adsorb air passageway into the desiccant bed. The parallel desorb air passageway is blocked by one of the louvers of the second set which opens only to air pressure in the opposite direction.

The heat exchanging desiccant bed provides the heart of the present invention and as the air passes down the air passageways defined by the parallel plates and the granular desiccant material bonded to the surfaces of the plates, the moisture and vapor of the saturated air is adsorbed and condensed in a zone progressing through the desiccant bed so that at the outlet end dry air of relative humidity only 20%-30% emerges. A feature and advantage of the present invention is that coolant fluid is circulated in the circulating channels throughout the desiccant bed to remove the liberated latent heat of adsorption and condensation and maintain the temperature of the desiccant bed in an efficient adsorption and condensation temperature range of approximately 60°-80° F. (15.5°-26.6° C.). In this temperature range high efficiency is maintained to achieve continuously the rated capacity of the air conditioning system.

Upon emerging from the desiccant bed through the fan and downstream louver of the adsorb air passageway, the conditioned air passes through the second heat exchanger of the adsorb air passageway closed heat exchange loop and on to a spray humidifier or moisturizer for evaporative chilling of the air to a desired temperature in the range of for example 60°-70° F. (15.5°-21.1° C.) and a relative humidity for example in the range of 40%-50% within the desired region of the comfort zone. The final spray humidifier or moisturizer for evaporative chilling may be controlled, for example, by a humidistat or other control including a microprocessor based control system for the desiccant air conditioner.

During the desorb cycle hot air is drawn by the fans through the desorb air passageway from for example the house attic or other hot location of a building through a heat exchanger which typically circulates a liquid heated by a solar collector for heating the desorb air to a desired desorption functional or regeneration temperature with solar energy. Upstream from the solar energy heat exchanger the second heat exchanger of a second closed loop heat exchange cycle is positioned for initially adding some heat to the inlet desorb air. This initial added heat is obtained from the exhaust desorb air emerging from the end of the desiccant bed. Thus, residual heat in the regeneration or recharge exhaust air passing through the outlet of the desorb air passageway is picked up by a first heat exchanger of a closed desorb heat exchange loop which transfers heat to the second heat exchanger at the desorb air inlet. The first and second heat exchangers in the desorb air passageway form a desorb closed heat exchange loop. The preheated inlet air then passes from the solar collector heat exchanger to the desiccant bed. With the fan reversed for blowing desorb air through the desiccant bed the inlet louver of the desorb air passageway opens and the louver in the adsorb passageway outlet shuts so that movement of air by the fan is restricted to the desorb air passageway.

The heated air blown through the desiccant bed draws and evaporates moisture from the extended surface area of the desiccant material. According to the present invention, external heat for example from the solar energy source is also imported into the system through the desiccant bed by circulating heated liquid such as water or aqueous solution through the circulating channels in heat exchange relationship with the desiccant bed further driving off moisture from the laden surfaces of the desiccant material. A feature and advantage of this arrangement is that external heat energy for example from an alternate energy source such as a solar collector can be imported and distributed with greater efficiency through the desiccant bed by means of a liquid such as water or a water solution with up to eight to ten times greater thermal transport efficiency than can be accomplished with air alone. The desorption air is therefore further heated by the desiccant bed functioning as a liquid to air heat exchanger. The exhaust air passes up through the louver in the desorb air passageway outlet giving up heat to the first heat exchanger of the desorb heat exchange closed loop for transport to the inlet end and the second heat exchanger as heretofore described. At the same time, the louver in the adsorb air passageway at the end of the desiccant bed is shut by the air flow to prevent unintended loss of air into the adsorb air passageway.

For winter use the desiccant air conditioner can be operated as a heating system with the desorption air passageway open to permit parallel passage of air through both the adsorption and desorption air passageways and therefore through both the desiccant bed and through the heat exchangers of the desorb air passageway. According to this mode of operation, hot water or other heated transfer fluid is circulated from the solar system or other alternative energy source through all of the heat exchangers of the adsorption and desorption air passageways and through the circulating channels of the desiccant bed providing extended heat exchange surface areas and heat exchange capacity of substantial magnitude for heating air to be circulated through the building or other structure.

Preferably however, the desiccant bed is blocked by side boards while the desorb air passageway is opened for passing air from the adsorb air passageway to the adsorb air outlet bypassing around the desiccant bed in a continuous sequence through all of the heat exchangers in the air passageways apparatus. Thus, in the heating mode, the building air is heated by passing through all the system heat exchangers, and the fluid circulating system is coupled for circulation of solar heated water or liquid through the heat exchangers.

For operation of the desiccant air conditioning system according to the present invention in the various modes of the adsorb cycle, desorb cycle and heating cycle a fluid circulating system of valves and pumps with appropriate alternative fluid paths are provided for coordinated operation with the movement of air through the respective adsorb and desorb air passageways. For this purpose a microprocessor-based control system may be provided for sensing the conditions of the desiccant bed on the one hand and the space to be air conditioned on the other hand for operation of the system in the appropriate respective modes.

At the heart of the present invention however is the method of air conditioning which contemplates drawing air to be conditioned through the inlet of an adsorb air passageway and preconditioning the air by initially moisturizing or humidifying the air for example by spraying to substantial saturation or supersaturation at substantially 100% relative humidity with accompanying evaporative cooling followed by addition of heat to the moisture-laden air. This preconditioning of the air according to the present invention increases and enhances the opportunity to export or remove net latent and sensible heat energy from the system for better control and more independent control of the temperature and humidity of the conditioned air in ranges of the desired comfort zone. Only after preconditioning is the moisture-laden air introduced into the heat exchanging desiccant bed for adsorption and condensation of the excess water or other moisture. A critical step of the invention follows by heat exchanging from the desiccant bed itself, exporting and removing net heat energy from the system namely the latent heat of condensation liberated by the adsorption and condensation of excess moisture from the air in the desiccant bed. This latent heat may be continuously moved according to the present invention by circulating cooling water or other liquid through the circulating channels of the desiccant bed. The circulating coolant is at a temperature lower than the air passing through the air passageways of the desiccant bed for high efficiency water or liquid coolant removal of heat. Thus, the present invention for the first time provides an efficient air to liquid and liquid to air heat exchanging desiccant bed for desiccant air conditioners such as desiccant solar air conditioning systems for net export and import of heat energy at higher efficiency, and from alternative energy sources. For air emerging from the desiccant bed, the invention contemplates the final conditioning steps of initially cooling the dried air using the second heat exchanger of the adsorb air passageway closed heat exchange loop followed by evaporative chilling and cooling which may be humidistat controlled or otherwise controlled to achieve both the desired temperature range and the desired relative humidity level. A feature and advantage according to the present invention is that a lowered air temperature is achieved, for example, in the range of 60°-70° F. (15.5°-21.1° C.) at the same time that the relative humidity of the air is maintained at a level below for example 40%-50% relative humidity, a result not achievable with previous air conditioning systems. The invention also contemplates the methods of operation in the desorb cycle and heating mode as set forth above and all as described hereafter with other features and advantages of the invention in the following specification and accompanying drawings.

DESCRIPTION OF PREFERRED EXAMPLE EMBODIMENTS AND BEST MODE OF THE INVENTION

Figure 1:
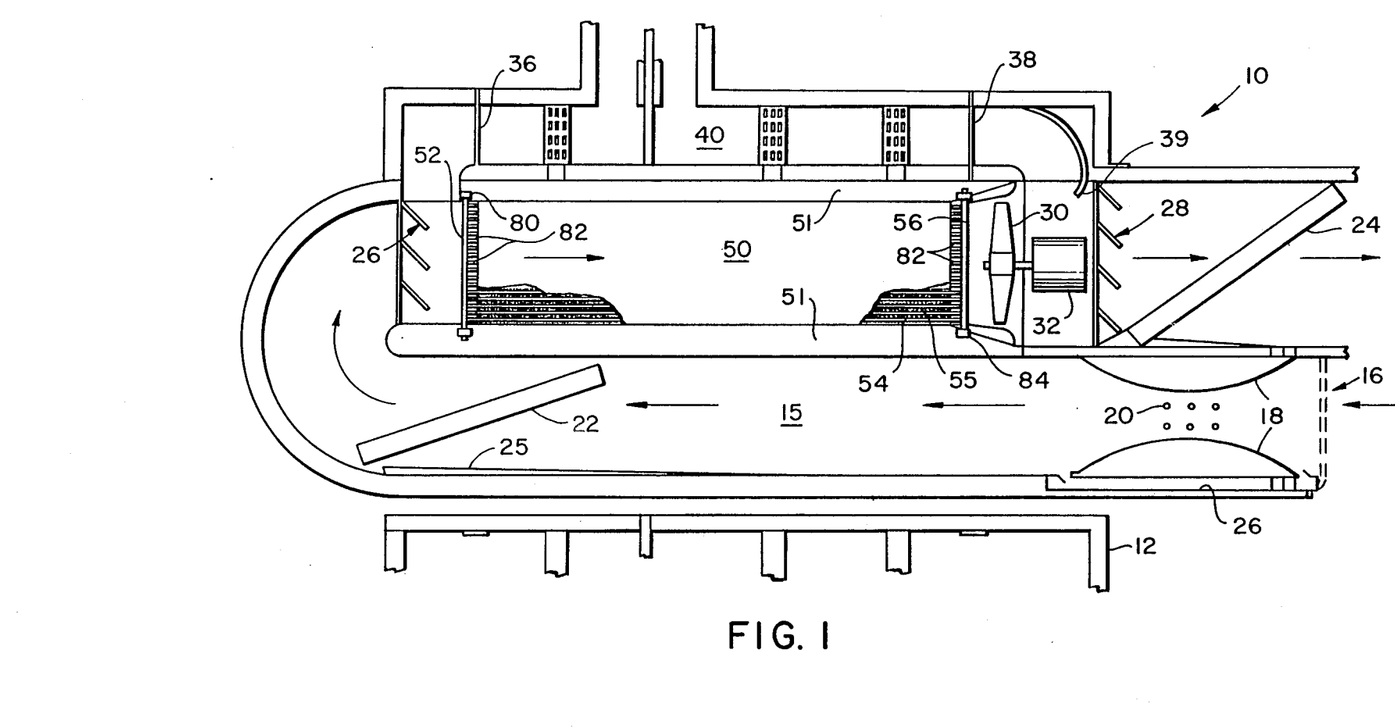
FIG. 1 is a diagrammatic view of the adsorb and desorb air passageways of the desiccant solar air conditioning system during the adsorb cycle.

The air passageways apparatus 10 of the desiccant solar air conditioning system appropriately mounted on a base 12 is illustrated in FIG. 1. House air or building air to be conditioned during the adsorption cycle enters the adsorb air passageway 15 through openings at the inlet 16 and between venturi restrictions 18 which effectively form a converging-diverging nozzle at the inlet. Spray tubes 20 inject fine water spray into the building air as it passes through the venturi or nozzle to increase the relative humidity of the air to substantially 100%. This increase in moisture content to substantial saturation or supersaturation lowers the temperature of the air so that it is cooler than when it entered the adsorb air passageway. The building air in the adsorb air passageway 15 therefore passes according to the invention through heat exchanger 22, the first of a pair of heat exchangers 22 and 24 which form a closed adsorb air passageway heat exchange loop. Heat exchanger 22 adds back into the building air heat extracted by heat exchanger 24 from the air exiting from desiccant bed 50. The building air cools the heat transfer fluid circulating between heat exchangers 22 and 24 as hereafter described. Any condensation of moisture in passageway 15 from the substantially saturated or supersaturated air collects on the incline tray or base 25 of adsorb air passageway 15 from which it is collected in the tray 26.

The present invention therefore provides in the upstream or inlet end of the adsorb air passageway 15 an air preconditioner composed of the moisturizer or humidifying spray from spray holes 20, and heat exchanger 22. The preconditioner preconditions the air to be adsorbed by first moisturizing the air to substantial saturation or supersaturation and then adding heat extracted from air exiting from the desiccant bed. The first step of saturating or supersaturating the air, maximizing the moisture content, also maximizes the latent energy of the humid air that can be released as heat of condensation and absorption in the desiccant bed and transported out of the system by the heat exchanging liquid coolant circulating in the channels of the desiccant bed. A second step is provided by the adsorb closed heat exchange loop which permits more heat extracted from air exiting from the desiccant bed to be removed by the heat transfer fluid circulating through the desiccant bed. Since the addition of heat to the incoming building air by heat exchanger 22 reduces the relative humidity, additional moisture can be added downstream from heat exchanger 22 to bring the relative humidity back up to substantially 100% with further cooling of the air.

The preconditioned air then passes through the upstream shutter or louver 26, one of a pair of shutters or louvers 26 and 28 in the adsorb air passageway. The first shutter or louver 26 is positioned at the upstream side of the desiccant bed while the second shutter or louver 28 is positioned at the downstream side of the desiccant bed downstream from the fan or blower 30 which is driven by the reversible electric motor 32. The fan 30 and motor 32 operate to draw or suck building air from inlet 16 through the adsorb air passageway 15, louver 26 and desiccant bed 50 and then blow the adsorb air through louver 28 and heat exchanger 24 to the final evaporative cooler not shown. The adsorb air passageway louvers 26 and 28 are oriented to open in the adsorb air stream flow. A second set of louvers 36 and 38 in the desorb air passageway 40 are oriented to close in response to the adsorb air flow generated by fan 30, isolating the desorb air passageway from the adsorption air flow.

Upon passing through louver 26 the preconditioned building air to be conditioned enters the desiccant bed 50 through the upstream header 52 and passes through the air passageways of desiccant bed 50 as a result of the pressure gradient established by the fan 30. It is the low pressure established by the fan that maintains louver 36 in closed position during the adsorption cycle isolating the desorb and adsorb air passageways from each other. Furthermore, the higher pressure on the downstream side of fan 30 assures that louver 38 remains closed. A removable deflector 39 diverts an airstream against the louver 38 to maintain closure.

Figure 4:
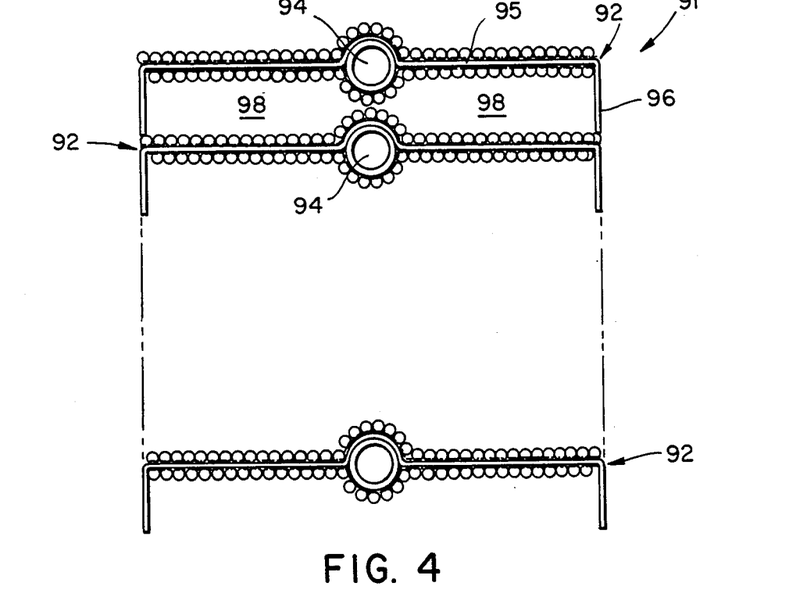
FIG. 4 is an end view of plates or fins of the desiccant bed forming a stack.
Figures 5, 6:
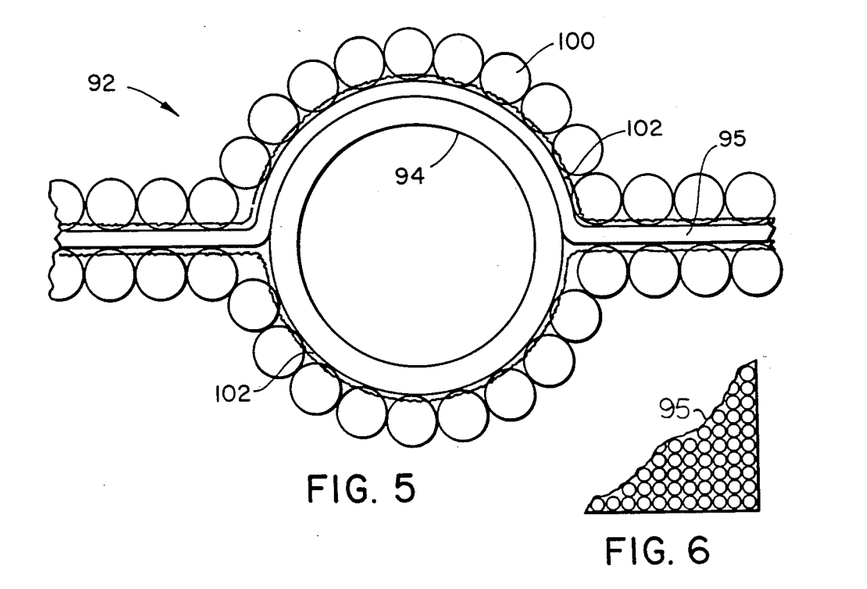
FIG. 5 is a detailed fragmentary end view of the plate or fin showing the intimate bonding of granular desiccant material to the heat conducting surface of the plate or fin.
FIG. 6 is a fragmentary plan view of the plate or fin showing the single packed layer of granular desiccant material bonded to the heat conducting surface.

The desiccant bed 50 shown in partial cross section in the cutaway of FIG. 1 and described hereafter in further detail with reference to FIGS. 4–6 is formed by one or more stacks of parallel plates 54 of heat conducting material such as aluminum covered with desiccant material such as granular commercial silica gel bonded to the heat conducting plates by, for example, a layer of adhesive bonding material which provides intimate contact. The plates 54 are spaced sufficiently far apart so that the granular silica gel or other desiccant material defines air passageways for contacting air passing through the desiccant bed. The air emerges from the desiccant bed 50 through the downstream header 56 and through the fan 30 and louver 28. The spacing of the parallel plates which may be, for example, tube fins or tube sheets and the size of the granular desiccant pieces assure a turbulent flow as the building air passes through the desiccant bed. Good heat exchange is also assured with the coolant liquid circulating throughout the desiccant bed as hereafter described. Furthermore, the plates are substantially equally spaced to assure even distribution of adsorb air across the desiccant bed.

The optimum size of the desiccant bed may be selected for establishing the rate of transfer of heat, the rate of adsorption of moisture from the air mass and therefore the capacity of the air conditioning system. With a regenerated or dry silica gel bed, adsorption of moisture from the building air during the adsorption cycle begins at the upstream end of the desiccant bed 50 after passing by the upstream headers 52. As the upstream silica gel or other desiccant becomes saturated the primary zone of adsorption moves downstream through the bed. For a typical domestic application, a desiccant bed of stacked tube fins prepared as hereafter described 4 feet (122 cm) in length, 12 inches (30 cm) high and about 12 inches (30 cm) with 140 lbs. (53.6 kg) of commercial silica gel provides a 1 to 3 ton (454.5 to 1,363.6 kg) capacity air conditioning system providing adsorption of moisture from saturated air flowing at the rate, for example, at 300 cubic feet per minute (8.5 cubic meters per minute) of from 20% of the moisture up to a theoretical adsorption maximum. In addition, the construction and arrangement of the system according to the invention results in additional removal of moisture by condensation in the desiccant bed beyond the adsorption limit. As a result, building air can be delivered at the downstream headers 56 of the desiccant 50 with a relative humidity of for example 20% to 30%.

Furthermore, throughout the adsorption cycle, the desiccant bed 50 is maintained in a temperature range of 60°–80° F. (15.5°–26.6° C.) by circulation of coolant liquid throughout the desiccant bed in the tubes or circulating channels which form an integral part of the desiccant bed structure as hereafter described. Thus the temperature of building air emerging from the desiccant bed is not excessive as may be the case in previous desiccant air conditioning systems. For example, the preconditioned air from heat exchanger 22 enters the desiccant bed at saturation, substantially 100% relative humidity and at a temperature slightly above room temperature of for example, 70°–72° F. (21.1°–22.2° C.) and exits the desiccant bed 50 with a relative humidity, for example, in the range of 20% to 30% and a temperature in the range of 70°–80° F. (21.1°–26.6° C.) with continuous circulation of coolant fluid at a temperature of for example, 69°–70° F. (20.5°–21.1° C.). Further details of the desiccant bed 50 with operating examples is set forth hereafter in the description with reference to FIGS. 4–6.

Returning to the structure of the air passageways apparatus, the dried air emerging from the desiccant bed 50 through the fan 30 at a relative humidity of, for example, 20% to 30% is then blown through louver 28 and the second heat exchanger 24 of the closed adsorb heat exchange loop composed of heat exchangers 22 and 24. Circulating coolant liquid, circulating between heat exchangers 22 and 24 is cooled by giving up heat at heat exchanger 22 and then is heated receiving heat from the dry building air so that the temperature of the dry building air is reduced from the range of, for example, 70°–80° F. (21.1°–26.6° C.) to, for example, 65°–70° F. (18.3°–21.1° C.) on the downstream side of heat exchanger 24. From there the preconditioned and dried building air is subjected to evaporative chilling in an evaporative cooler not shown which incorporates for example a spray cooler for fine spray of water into the building air reducing the temperature to a desired level of, for example, 60°–70° F. (15.5°–21.1° C.) and raising the relative humidity to the range of 40% to 50%. The temperature and humidity fall within the desired region of the comfort zone.

Figure 2:
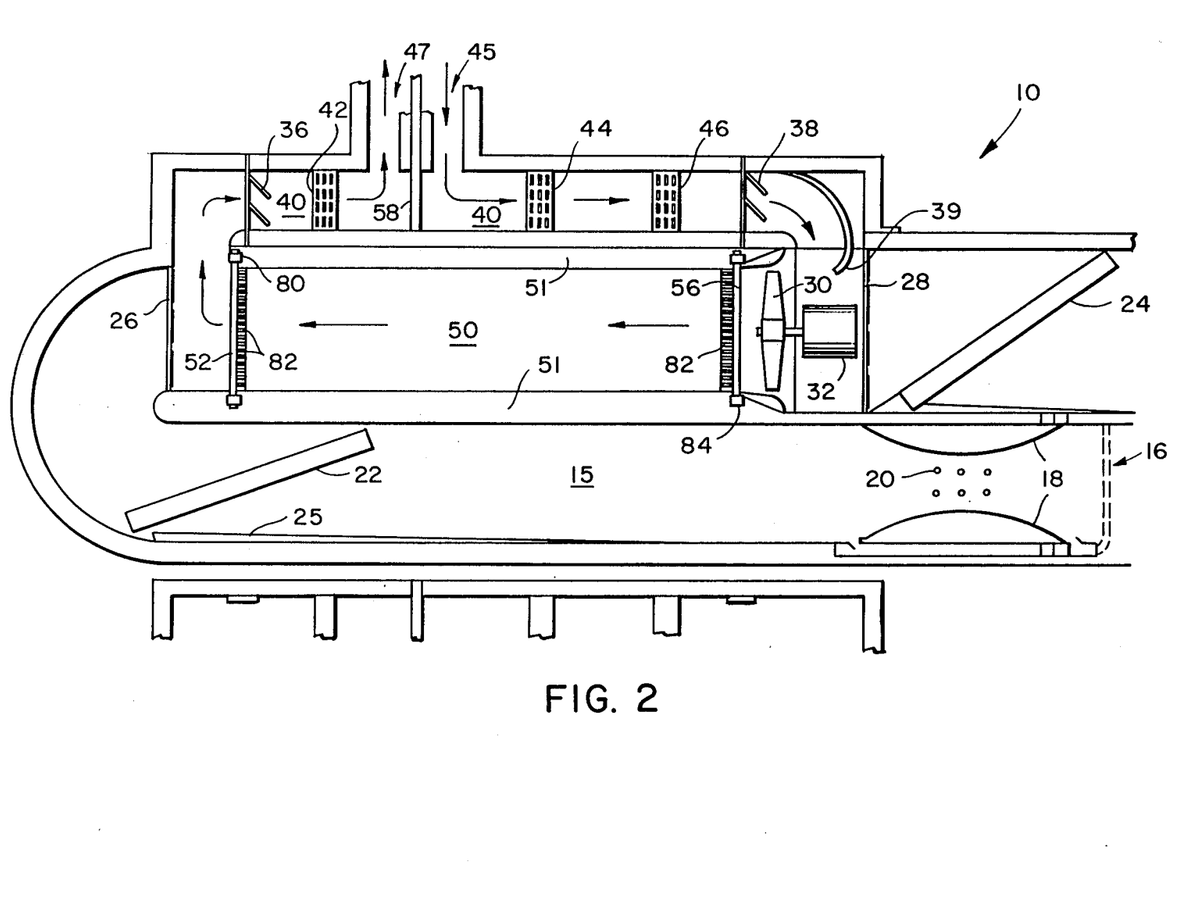
FIG. 2 is a diagrammatic view of the system adsorb and desorb air passageways during the desorb cycle.

Operation of the air passageways apparatus of the desiccant air conditioning system during the desorption or regeneration cycle is illustrated in FIG. 2. In this mode of operation the motor 32 and fan 30 are reversed blowing the heated desorb air through the desiccant bed 50 for evaporating moisture from and regenerating the desiccant material of the desiccant bed. In this mode of operation hot air is drawn, for example, from the attic or other hot air location of a building into the desorb air passageway 40 at the inlet 45. The direction of air flow and pressure established by the fan 30 opens the desorb air passageway louvers 36 and 38 while closing the adsorb air passageway louvers 26 and 28, isolating the desorb air passageway from the adsorb air passageway.

Desorb air entering at the inlet 45 of desorb air passageway 40 is first preheated by the second heat exchanger 44 of a desorb air passageway closed heat exchange loop consisting of heat exchangers 42 and 44. Heat exchanger 42 in the exhaust path or outlet of the desorb air passageway picks up and exchanges excess heat from the exhaust air heating a circulating heat transfer liquid circulating between the closed loop heat exchangers 42 and 44 for preheating the inlet desorb air passing through heat exchanger 44. Substantial additional heat and substantial increase in temperature of the desorb air to a desired regeneration temperature is then effected by solar heat exchanger 46 through which circulates hot water or other heat transfer fluid from solar collectors as hereafter described with reference to FIG. 3. By way of example, solar heat exchanger 46 preferably brings the desorb air to a regeneration temperature in the range of 110°–150° F. (43.32°–65.5° C.) with an accompanying reduction in relative humidity. For example, incoming air from a house or building attic at 80° F. (26.6° C.) and relative humidity as high as 70% is heated to a regeneration temperature as set forth above with an accompanying reduction in relative humidity down to as low as 5%.

The fan 30 acting as a blower then pressurizes the desorb air in the saturated bed 50 producing turbulent flow to facilitate drying and regenerating the desiccant bed. Drying initially occurs at the upstream end as the desorb air passes by headers 56 and the drying zone progresses down the desiccant bed to the downstream headers 52 at which time evaporation and regeneration are complete.

To enhance the efficiency and rate of regeneration according to the invention, hot water or other heat transfer liquid is circulated through the tubes or circulating channels throughout the desiccant bed 50 from the hot water tank or source of hot water or other heat transfer fluid heated by the solar collectors as hereafter described with reference to FIG. 3. Thus, according to the invention, desorption of moisture from the desiccant bed 50 is accomplished simultaneously by the import of heat from both the solar preheated desorb air and the solar heated heat transfer liquid circulating in the channels of the desiccant bed. A feature and advantage of the addition of the water to air heat exchanging function of the desiccant bed according to the present invention is that water heating or heat transfer fluid heating of the desiccant bed affords thermal exchange and thermal conductivity through the heat transfer fins to the desiccant material at a rate of 8 to 1 and greater than air to air heat exchange alone.

The arrangement of fan 30 and reversible drive motor 32 for blowing air through the desiccant bed 50 during the desorption cycle, and sucking or drawing air through the desiccant bed 50 during the adsorption cycle have been shown experimentally to be advantageous in the following respects. The drawing action of the fan lowers pressure in the desiccant bed in effect sucking air through the air passageways of the bed. Experimental results have shown that the adsorption desiccant bed operates more efficiently when the air is drawn or sucked through rather than blown through. The reduction in pressure due to the sucking action of the fan produces a saturated or supersaturated condensation condition increasing the mass transfer rate by both adsorption and condensation of the moisture from the air to the extended surface area of the silica gel or other desiccant material.

A unique feature of the present invention arises from the addition of moisture to incoming air. This addition of moisture serves two functions, first spray cooling the incoming air and second increasing the moisture that can be removed in the desiccant bed. The increased adsorption and condensation of moisture from the saturated building air make it possible to release more latent heat which is carried away by the circulating water or other heat transfer fluid in the circulating channels of the desiccant bed for more effective drying and subsequent cooling of the building air. As a result, the present invention achieves far greater removal of water by adsorption and condensation from the saturated or supersaturated air.

The air passageways apparatus 10 (FIGS. 1 and 2) of the desiccant air conditioning system of the present invention can also be operated in a heating mode during the winter for example utilizing solar energy. According to this mode of operation of the air passageway apparatus 10, slide boards, not shown are inserted from the side over the headers 52 and 56 at each end of the desiccant bed 50 blocking the air passageway through the desiccant bed and effectively eliminating the passageway through the desiccant bed 50 as if it were not there. At the same time, slide board 58 (FIG. 2) which forms the partition between the inlet 45 and outlet 47 of the desorb air passageway 40 is removed providing a continuous path around the desiccant bed 50. The slide board 58 is then inserted from the side horizontally blocking the inlet 45 and outlet 47 of the desorb air passageway 40 to provide a closed loop passageway around the desiccant bed.

Referring further to FIG. 2, during the heating mode in winter, building air or house air may be drawn through the inlet 16 of the adsorb air passageway 15 passing through heat exchanger 22 and louvers 26 and 36 into the series coupled desorb air passageway 40. The adsorb air passageway 15 and desorb air passageway 40 therefore provide a continuous air heating passageway. In the desorb air passageway 40 the building air to be heated passes through the sequence of heat exchangers 42, 44 and 46 with slide board 58 removed, turned and inserted horizontally to block the inlet 45 and outlet 47. The heated air passes on through the louvers 38 and 28 to a final heat exchanger 24 in the outlet duct leading to an alternative heat outlet duct to the space area to be heated. Further heat exchangers can of course be provided at the downstream outlet end following heat exchanger 24.

In the heating operating mode, a heating air fan not shown would of course be provided for example in the alternative downstream heat outlet duct not shown leading to the space area to be heated. The heating air fan draws air from selected locations of the building through the inlet 16 and the continuous air heating path provided by the adsorb air passageway 15 and desorb air passageway 40. Furthermore, as hereafter described, the water circulating system or other heat transfer liquid circulating system is operatively arranged with valves and alternate circulating conduit paths for circulating the hot water or other heat transfer fluid from a hot storage tank through the respective heat exchangers 24, 46, 44, 42 and 22. The coupling from the hot water or hot fluid storage tank may be made in parallel through the separate heat exchangers, in series from the downstream to the upstream end of the single loop combined air passageway, or a parallel and series combination of heat exchangers in the adsorb air passageway 15 and desorb air passageway 40 which lead around the desiccant bed 50 as described above. Further description of the water or other heat transfer liquid circulating system during the heating mode is set forth hereafter in the discussion with respect to FIG. 3A.

Figure 3:
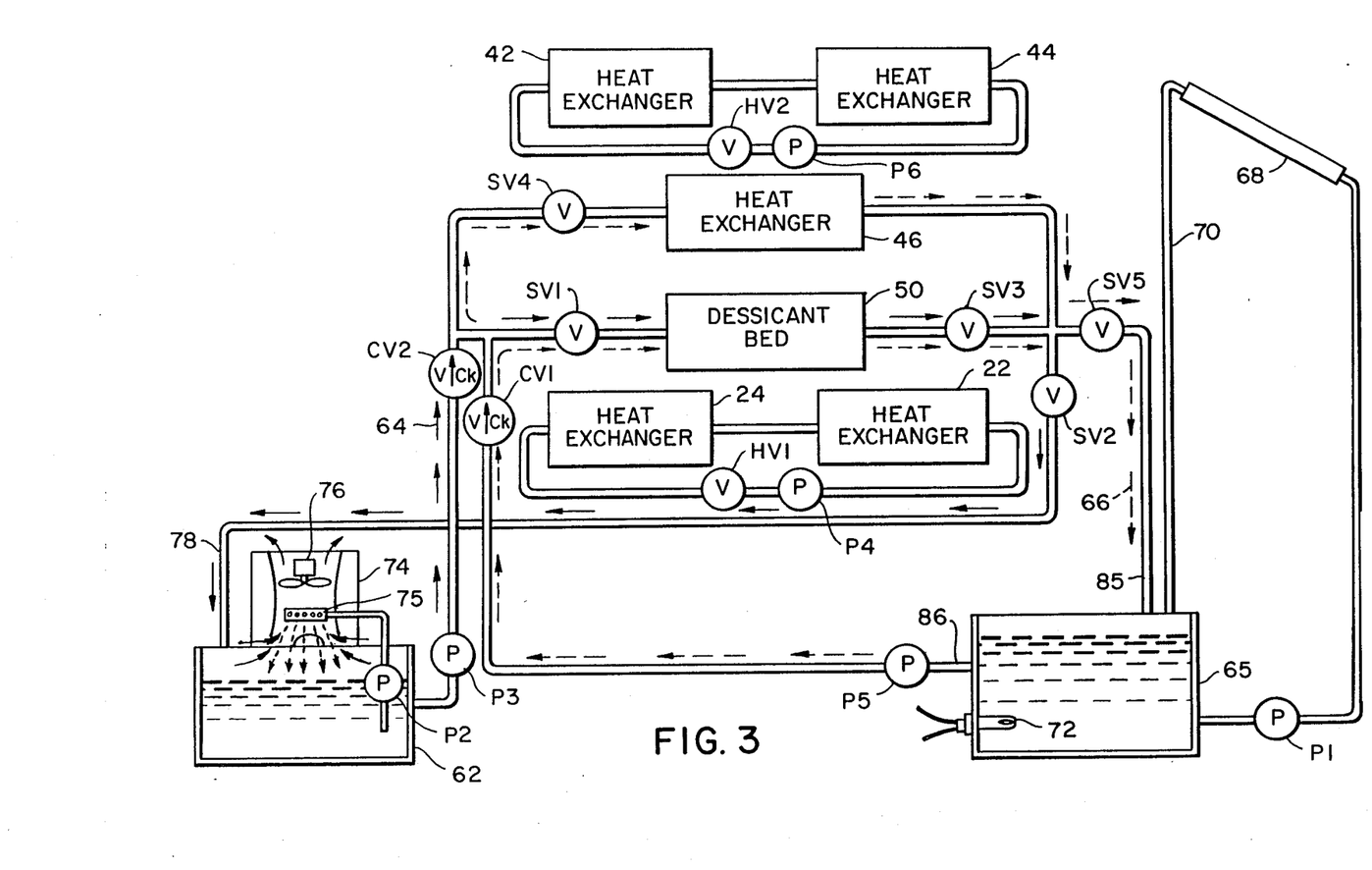
FIG. 3 is a diagrammatic view of the circulation system for water or other heat transfer fluid of the desiccant solar air conditioning system during the adsorb and desorb cycles.

The water or other heat transfer fluid circulating system 60 for the desiccant air conditioning system is illustrated in FIG. 3. The circulation of cooling water or other heat transfer fluid from the cold storage tank 62 during the adsorption cycle is indicated by the solid arrows 64 while the circulation of hot water or other heat transfer fluid from the hot tank 65 during the desorption cycle is shown by the broken or dashed arrows 66. The reference to water as the circulating fluid in the following discussion is intended to encompass water, water solutions and any other appropriate circulating heat transfer liquid.

The heat energy for maintaining water in the hot storage tank 65 at a desired regeneration temperature for example in the range of 110°–150° F. (43.3°–65.5° C.) is derived from solar collectors 68 in the solar heating circuit or loop 70 in which fluid is circulated by means of pump P1. Backup heating is provided by electrical heating element 72 during periods of inadequate solar derived energy. Backup electrical heating may be operated during off-peak demand or off-peak load periods for considerable savings in utility costs. For storage of off-peak energy the hot storage tank 65 can be large volume capacity and well insulated for heat energy storage. It is in this respect that electrical heating elements 72 can play a greater role than backup only for the solar collector 68 by using the off-peak electrical generating capacity during off-peak hours for storage of heat energy.

In the cold tank 62 water or other fluid is maintained at room temperature or slightly below and a number of techniques are used to lower the temperature below average ambient temperature. For example, as shown in FIG. 3, an evaporative cooler 74 is mounted over the tank with a sprayer 75 which sprays water back into the tank using a circulating pump P2 in a counter-current flow of air established by fan 76. Such continuous evaporative cooling maintains the water in cold tank 62 below ambient building temperature provided the ambient humidity is below 100%.

Alternatively, ground water cooling may be used by circulating ground water in a coil through the tank or by circulating the water in the tank through an underground cooling loop or circuit not shown. According to other approaches, liquid in the cold tank 62 may be circulated through the solar collector at night using the solar panel in reverse. Alternatively, tube sheets or tube fins may be specially provided separate from the solar collector panels for cooling the fluid by heating night air. For example, on a clear night radiation will bring the water temperature down to 10° F. (5.5° C.) below ambient night air temperature. To this end, cold storage tank 62 may also be large volume capacity and well insulated. Additionally, after passing through the desiccant bed, water or other cooling liquid can be returned to the cold tank 62 through a cooling tower.

During the adsorption cycle pump P3 is operating circulating coolant fluid through the circulating channels of the desiccant bed 50. Valves SV1, SV3 and SV2 are of course open permitting flow through the cold water circuit or loop to the return 78 at cold tank 62. Valve SV4 is closed block flow to heat exchanger 46 while check valve CV1 prevents the coolant liquid from entering the hot water tank 65. Referring to FIG. 1, the cold water enters the desiccant bed through an inlet tube 84 at the bottom of header 56 which provides a plenum from which the fluid enters the circulating channels or tubes 82 of the desiccant bed 50. Circulating fluid exits the desiccant bed through header 52 which also forms a plenum for the circulating tubes or channels 82 and finally through the outlet 80 from header 52.

At the same time pump P4 is operating in the adsorb air passageway closed heat exchange loop between heat exchangers 22 and 24 with valve HV1 open. Valve HV1 is, for example, a hand valve which is closed only during the winter heating mode hereafter described with reference to FIG. 3A. The fluid in the closed loop passing through heat exchanger 22 gives up heat to building air in the adsorb air passageway 15 while cooling the water which then circulates to heat exchanger 24 for initial cooling of the dried air emerging from the desiccant bed.

During the adsorb cycle the pump P5 from hot tank 65 is off. Check valve CV1 prevents any flow of cold water back in the direction of hot tank 65 and valve SV4 is closed preventing circulation of cold water through heat exchanger 46. Similarly, valve SV5 in the return path is closed to block return of cold water to hot tank 65.

During the desorption or desorb cycle for regenerating the desiccant bed, pump P5 is operating for circulation of solar heated hot water through the circulating channels of desiccant bed 50 and the desorb air passageway primary heat exchanger 46. To this end, valves SV1 and SV4 are open respectively leading to the desiccant bed 50 and heat exchanger 46. Similarly, valves SV3 and SV5 in the return path to hot tank 65 are open for return of spent hot water to the return inlet 85 of hot tank 65 which releases returning liquid above the surface of the water or other liquid in the tank to prevent air lock. The return 85 is at a location remote from the outlet 86 and outlet 86 is positioned near the top of the water level or other fluid level for circulating the hottest water in the tank 65.

During the desorption cycle pumps P3 and P4 are off although P2 in the evaporative cooler of cold tank 62 operates for cooling the water in the tank. Similarly, pump P1 may continue to operate for heating the water in the hot tank 65 when there is sufficient temperature differential between solar panel 68 and hot tank 65 for efficient water heating. Check valve CV2 prevents hot water from entering cold tank 62. The return valve SV2 in the return line of the cold water loop is of course closed to prevent return of the spent hot water into the cold tank. As a result, the spent hot water from heat exchanger 46 and desiccant bed 50 return through the open valves V5 to hot tank 65.

During the desorption cycle pump P6 in the desorb air passageway closed heat exchange loop provided by heat exchangers 42 and 44 is on and valve HV2 is open. Valve HV2 may be, for example, a hand valve which is closed only during the winter heating mode. As a result, excess heat from the exhaust desorb air after passage through the desiccant bed 50 is extracted by heat exchanger 42 before venting the desorb air exhaust through the outlet 47 of the desorb air passageway 40. The heated fluid from heat exchanger 42 is circulated through heat exchanger 44 for preheating desorb air drawn through the inlet 45 of the desorb air passageway 40. By this closed loop arrangement heat energy is recycled for desorption of moisture from the desiccant bed 50. Pump P6 is off during the adsorb cycle.

During the adsorb and desorb cycles, cooling liquid from cold tank 62 and heating liquid from hot tank 65 circulate respectively in the tubes or channels of the desiccant bed 50. Between cycles, appropriate arrangements are therefore made for draining the liquid from the previous cycle to its respective tank before circulating liquid of opposite temperature from the other tank. This is accomplished by appropriate valve or pump circulating components and system geometry. By this expedient the heat energy of the respective tanks may be conserved during cycling operation.

The elements of the air passageway apparatus 10, namely the desiccant bed 50, desorb air passageway 40 and adsorb air passageway 15 are insulated at locations where temperature differences would otherwise result in undesirable heat flow, particularly between the desiccant bed 50 and desorb air passageway 40. Thus a layer of insulation 51 is provided around the desiccant bed 50, thermally isolating it from the air passageways 40 and 15.

Figure 3A:
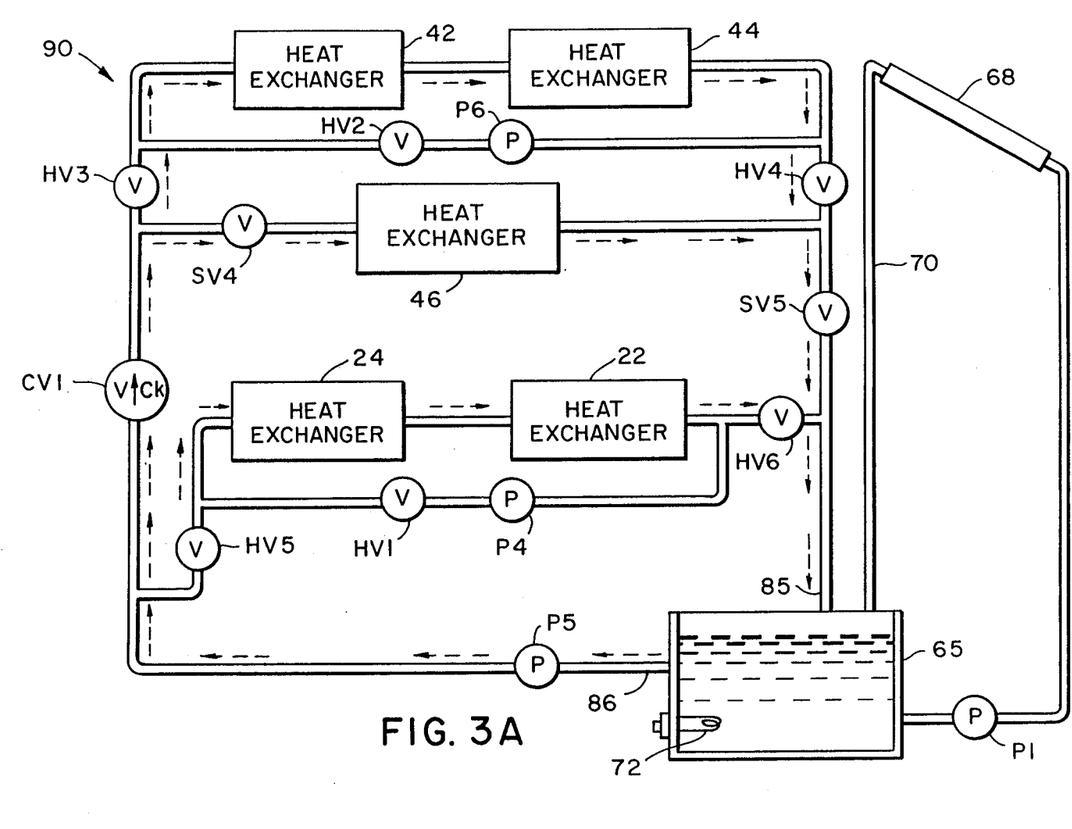
FIG. 3A is a diagrammatic view of the heat transfer fluid circulating system during operation of the system in the heating mode for heating air.

Operation of the circulating system 60 (FIG. 3) as a heating system 90 (FIG. 3A) using the air passageway apparatus 10 (FIGS. 1 and 2) is illustrated in FIG. 3A. The system may be operated in the heating mode with or without the desiccant bed 50 as an additional heat exchanger. If the desiccant bed is to be effectively removed from the system, slide boards are positioned across the headers 52 and 56 at each end of the desiccant bed. In the water circulating apparatus valves SV1 and SV3 in the circulating loop on each side of the desiccant bed are closed. Additional valves may be incorporated into the circulating system 60 as may be necessary to achieve the configuration of the heating system 90 of FIG. 3A.

Referring to FIG. 3A, pump P5 is operating for circulating hot water from the hot tank 65 through all the heat exchangers in the air passageways apparatus 10 as heretofore described. A circulating link may be provided through valves HV3 and HV4 to heat exchangers 42 and 44 of the desorb air passageway heat exchange loop. With pump P6 off and valve HV2 closed the hot water or other heated fluid is constrained to circulate through the heat exchangers 42 and 44 returning to hot tank 65 through open valve SV5 and the return 85. Similarly, a circulating link may be provided through valves HV5 and HV6 to heat exchangers 24 and 22 of the adsorb air passageway heat exchange loop. With pump P4 off and valve HV1 closed hot water circulates through heat exchangers 24 and 22 to the return 85 at hot tank 65. Valves HV3–HV6 may all be hand valves which are closed during the summer cooling season and opened only during the winter heating season. Finally, a primary hot water flow passes through open valve SV4 through heat exchanger 46 in the desorb air passageway with return through valve SV5 and return 85 to hot tank 65. Additional heat exchangers can of course be provided in the heating air passageways for greater heat transfer.

Referring to FIG. 2, as heretofore described in the heating mode, slide board 58 is removed and inserted horizontally blocking the inlet 45 and outlet 47 of the desorb air passageway so that the desorb air passageway 40 provides a single passageway in series with the adsorb air passageway 15 around the desiccant bed 50 for passage of the building air to be heated through all of the heat exchangers 22, 42, 44, 46 and 24 and any additional heat exchangers which may be provided through which the water or other liquid from hot tank 65 is circulating. For this mode of operation a heating fan, not shown, may be provided in an alternative downstream or outlet heating duct, not shown, of the air passageway apparatus 10 and the desiccant bed fan 30 and fan motor 32 are off. The air diverter 39 is retracted or removed so that it does not obstruct air flow in the heating mode.

Referring to FIG. 3, if it is desired to use the desiccant bed as an additional heat exchanger, valves SV1 and SV3 can be opened (and slide boards at headers 52 and 56 of the desiccant bed 50 removed) providing an additional air heating heat exchange pathway.

To increase the capacity of the circulating system for hot water heating, the cold tank and hot tank may be joined by connecting conduits or pipes for operation of the cold tank as an additional hot water storage tank in winter. A pump or pumps circulate and distribute water between the tanks to increase the total hot water storage capacity.

The operative valves and pumps of the circulating system 60 operating in the adsorb and desorb cycles and as a heat circulating system 90 during the heating mode, and the operation of the desiccant bed fan motor 32 of the air passageways apparatus 10 and a heating fan motor not shown may be operated by an electrical control system such as a microprocessor based control circuit for cyclical, timed, coordinated or controlled operation of the desiccant air conditioning system in the adsorb, desorb and heating modes or cycles. To this end, the valves SV1–SV5 may be for example electrically controlled solenoid valves while pumps P1–P6 and fan 30 or other fans in the air passageways apparatus are operated by electric motors. The electric valves, pumps and motors are in turn operated by the control circuit with a microprocessor programmed for coordinated operation of the valves, pumps and motors to achieve the desired cyclic, timed or parameter sensing based operation of the desiccant air conditioning system in the different adsorb, desorb and heating cycles or modes. To this end, the condition of the valves SV1–SV5 either open or closed, the condition of hand valves HV1–HV6, the condition of the pumps P1–P6 either on or off, the condition of desiccant bed fan motor 32 either blowing or drawing air through the desiccant bed, and the condition of any auxiliary heating fan, not shown, are set forth in the following Table 1 for the respective adsorb, desorb and heating mode cycles. It should kept in mind that during the heating mode an additional heating fan is provided for the air passageways of the apparatus downstream from heat exchanger 24, which can also be used to provide additional air flow during cooling mode operation. The final evaporative sprayer or moisturizer, not shown, can also be used in the heating mode to humidify the exiting heated air to a desired relative humidity.

TABLE 1

| System Component | Adsorb Cycle | Desorb Cycle | Heating Mode |
| --- | --- | --- | --- |
| SV1 | Open | Open | Closed |
| SV2 | Open | Closed | Closed |
| SV3 | Open | Open | Closed |
| SV4 | Closed | Open | Open |
| SV5 | Closed | Open | Open |
| HV1 | Open | Open | Closed |
| HV2 | Open | Open | Closed |
| HV3 | Closed | Closed | Open |
| HV4 | Closed | Closed | Open |
| HV5 | Closed | Closed | Open |
| HV6 | Closed | Closed | Open |
| P1 | On | On | On |
| P2 | On | On | Off |
| P3 | On | Off | Off |
| P4 | On | Off | Off |
| P5 | Off | On | On |
| P6 | Off | On | Off |
| Fan Motor 32 | Drawing | Blowing | Off |
| Heat Duct Fan (not shown) | Off | Off | On |

In cycling operation, for example under control of a microprocessor based control system, the desiccant air conditioner may be alternately operated in the adsorb and desorb cycles. For a system as described hereafter with reference to Examples 1 and 2, the desiccant air conditioner may be operated, for example, 30 minutes of adsorb cycle operation alternating with 15 minutes of desorb cycle operation. The desiccant bed of Examples 1 and 2, however, may be operated for up to 2 hours before complete saturation of the desiccant material. Alternatively or additionally, two desiccant beds can be provided with one operating in the adsorb cycle while the other is operating in the desorb cycle.

The structure of the desiccant bed 50 according to a preferred example embodiment is illustrated in FIGS. 4, 5 and 6. According to a preferred example embodiment the desiccant bed 50 may comprise several adjacent side-by-side stacks of tube fins or tube sheets prepared according to the invention. Such a stack 91 of fin tubes or tube fins 92 is illustrated in FIG. 4 with a fragmentary detail view of one of the tube fins 92 shown in FIG. 5. Each tube fin comprises a circulating tube or channel 94 of liquid confining thermally conducting material such as copper to which is soldered, welded or otherwise intimately bonded a fin 95 of heat conducting metal such as aluminum for good thermal conductivity. The ends of the fins 95 are folded over providing spacers 96 for spacing the plates in substantially parallel relationship from each other and for defining air passageways 98 between the fins 95. The substantially equal and parallel spacing of the tube fins 92 and plates 95 substantially equalizes fan induced pressure gradient over the desiccant bed for equalizing flow of air through the bed during the adsorb and desorb cycles.

The desiccant material and extended desiccant surface area throughout the desiccant bed is provided by silica gel granules such as commercial silica gel, for example in the form of spheres 100 intimately contacting and bonded over the surfaces of the tube fins 92. For adhesive bonding of the silica gel spheres 100 to the surfaces of the tubes 94 and fins or plates 95 of the tube fins 92 a thin layer 102 of an adhesive bonding glue which also forms a good heat conducting layer is applied over the surfaces of the circulating tube 94 and fins or plates 95. An adhesive bonding material or glue such as silicon rubber glue provides the advantages of intimate bonding and good thermal conductivity. To enhance the thermal conductivity of the adhesive layer, metal particle filler may be added to the silicon rubber glue or other glue. Such metal particle filler may also be incorporated in the silica gel to improve thermal conductivity. The silica gel spheres 100 are then spread over the surface and pressed through the layer 102 of silicon rubber glue until they actually touch the aluminum fins or plates 95 and tube 94. An advantage of using aluminum for the fins, sheets or plates 95 is that the pores in aluminum facilitate adhesive bonding of the layer 102.

The layer 102 of glue is spread to a depth over the surfaces of the tube fins 92 so that 80%–90% of the surface of the spheres is available for performing the desiccant adsorption function of adsorbing and collecting water vapor from building air passing through the air passageways 98. Thus, 10%–20% of the surface of the spheres is bonded by the layer 102 in contact with the fins or plates. A fragmentary plan view of the corner of a tube fin is illustrated in FIG. 6 showing the contact packing of the silica gel spheres over the surface of the tube fins forming substantially a single granular layer over the surfaces.

A feature and advantage of the use according to the present invention of a single layer of granular size silica gel rather than powdered silica gel is that the larger monolithic granular masses permit greater heat conductivity between the desiccant material and the surfaces of the tube fins 92 while at the same time providing exposed extended surface area over tortuous surfaces for inducing turbulent flow through the air passageways 98.

While the preferred example embodiment is described with reference to silica gel spheres, other granular size forms of silica gel such as crushed pieces, pellets, etc., may also be used but in the preferred granular size range greater than powder size, that is, in the mesh size greater than U.S. or Tyler standard mesh size 50 and preferably from mesh size, for example, 20 up to mesh size 4 and greater. Thus, the diameter of the granules, pieces, pellets or spheres is in the optimum range of for example 1/32 inch to ¼ inch (0.08–0.65 cm). Either before or after the larger size granules are pressed through the silicon rubber glue layer to contact the surfaces of the fin tubes 92 as for example illustrated in FIG. 5, smaller pieces of desiccant material (not shown) may also be added between the interstices of the larger granules for example silica gel of the smaller granular size approaching powder size.

While silica gel is the preferred desiccant material, other desiccants may also be used such as activated alumina or aluminum oxide which requires a higher temperature than silica gel for regeneration or reactivation. Another example desiccant material is zeolite which adsorbs rapidly but desorbs more slowly than silica gel requiring a longer regeneration or recharging time. Silica gel is therefore the preferred desiccant material.

Furthermore, the example embodiment of FIGS. 4–6 utilizes tube fins or fin tubes 92 of the type presently used in, for example, solar collectors as the base for the granular silica gel and the unit element of the stacked parallel plates. Other parallel plate structures with heat conducting surfaces and circulating channels may of course also be used such as tube sheets. Tube sheets are two sheets of metal welded, bonded, or laminated together with air space channels between the sheets defining liquid circulating channels. Other configurations may also be used which provide extended surfaces of heat conducting material and circulating tubes or channels which may be stacked in substantially parallel arrays defining air passageway channels between the parallel plates.

By way of example, a desiccant bed 50 was constructed of three adjacent side-by-side stacks of tube fins 92 with nineteen tube fins per stack and with overall dimensions of the desiccant bed of approximately 4 feet (122 cm) long, 1 foot wide (30 cm) and 12 inches (30 cm) high with the tube fins constructed and stacked as illustrated in FIGS. 4 and 5 and with commercial silica gel granules approximately ⅛ inch (0.3 cm) diameter bonded over the surfaces. The fins or plates of the tube fins provided approximately 150 ft$^2$ (14 m$^2$) of planiform surface area in the bed and approximately 500 ft$^2$ (46.5 m$^2$) of sphere surface area. The surfaces of the desiccant bed were covered with approximately 140 lb. (63.6 kg.) of the commercial silica gel. Such commercial silica gel may be obtained, for example, from Eagle Chemical Company, Mobile, Ala. Another silica gel which may be used in the bed is for example the Brite-Sorb (trademark) silica gel spheres supplied by PQ Corporation of Philadelphia, Pa., or other similar sources. Such spheres with pore size averaging 25 A° provide adsorption surface area of 750 m$^2$/gm.

The desiccant bed having the foregoing specifications was incorporated in an air passageway apparatus of the type illustrated in FIGS. 1 and 2 with an adsorb air passageway approximately 12 inches (30 cm) high by 12 inches (30.5 cm) wide. Each of the heat exchangers 22 and 24 was provided by a pair of inclined adjacent heat exchange elements 26 inches (66 cm) long by 6 inches (15 cm) wide by 2 inches (5 cm) thick. Air was drawn through the desiccant bed 50 and adsorb air passageway 15 by the fan 30 operating in the sucking or drawing mode at 300 ft$^3$/minute (8.5 m$^3$/minute).

EXAMPLE 1

Incoming building air or house air was drawn through the inlet of adsorb air passageway 15 with inlet air conditions at 78° F. (25.5° C.), relative humidity of 40%, and specific humidity of 56 grains/lb of dry air. The moisturizer sprayer at the venturi restrictions 18 added water vapor through fine spray holes 20 increasing the relative humidity from 40% to 100% and the specific humidity to 82 grains/lb dry air while evaporative cooling lowered the temperature of the air from 78° F. (25.5° C.) to 60° F. (15.5° C.). The water was sprayed by the moisturizer in a fine spray at household temperature to achieve this result.

Upon passing through heat exchanger 22 heat was added to the air flow raising the temperature to approximately 70°–72° F. (21.1-22.2° C.) substantially near 100% relative humidity.

The building air preconditioned as set forth above was then drawn through the desiccant bed for adsorption, condensation and removal of moisture from the air with the drying zone moving down the bed from the upstream to the downstream end as the upstream zones become laden with moisture and saturated. Cooling water was circulated through the tubes or channels of the desiccant bed 50 through the inlet 80 and out the outlet 84 at a temperature of approximately 69°–70° F. (20.5°–21.1° C.) for removing latent heat of adsorption and condensation with net removal of heat energy from the building air moving through the desiccant bed.

At the output end of the desiccant bed 50 the desiccant bed output air conditions were air temperature in the range of 70°–80° F. (21.1°–26.6° C.), relative humidity of 20%–30%, and specific humidity of approximately 40 grains/lb dry air.

The cooling water temperature may increase for example to a range between 70°–76° F. (21.1°–24.4° C.) while maintaining air condition temperature at the output of the desiccant bed in the range of 70°–80° F. (21.2°–26.6° C.). After passing through the outlet heat exchanger 24 the adsorb air passageway outlet air conditions were air temperature approximately 69°–70° F. (20.5°–21.1° C.), relative humidity 20%–30%, with a specific humidity of approximately 40 grains/lb dry air.

The final step in the air cooling/air conditioning process is the conventional step of evaporative cooling or chilling by a controlled moisturizing spray. Using a fine mist sprayer, the final system output air conditions were air temperature 60°–65° F. (15.5°–18.3° C.), with a relative humidity of 40%–50% providing final air conditioned air for circulation in the building space within the desired comfort zone range of the psychometric or Moliere charts.

A feature and advantage of the present invention is that much greater removal of moisture is achieved in the desiccant bed 50 of the present invention in the range of, for example up to the theoretical maximum of adsorption by the silica gel which is 39% by weight of the silica gel with additional removal of water by condensation as compared with other desiccant beds which have removed moisture only in the range of, for example, up to 8%. At the same time the system and method of the present invention maintains the air temperature at a reasonably low level without excessive heating. The final result of dryer air at lower temperature at the output of the desiccant bed and final heat exchanger 24 permits greater independent control of the temperature and humidity of the building air during the final step of evaporative chilling. For example, according to the present invention evaporative chilling resulted in Example 1 in air temperatures in the range of 60°–65° F. (15.5°–18.3° C.) while leaving the relative humidity at the low level of 40%–50%. Greater reduction in air temperature for example to 55°–60° F. (12.7°–15.5° C.) is therefore permitted while still maintaining the relative humidity for example at a level below 65%.

EXAMPLE 2

House air was drawn through the inlet 16 of the adsorb air passageway 15 with inlet air conditions at a temperature of 80° F. (26.6° C.), relative humidity of 50% and specific humidity of 84 grains/lb dry air. Air conditions following the fine mist sprayers 60 were temperature 67° F. (19.4° C.), relative humidity 100% and specific humidity 106 grains/lb dry air. After passing through the first heat exchanger 22 with addition of heat to the air flow the preconditioned air conditions upstream from the desiccant bed 50 were air temperature 71°–72° F. (21.6°–22.2° C.), relative humidity near 100% and specific humidity 106 grains/lb dry air. Following adsorption through the desiccant bed 50 air conditions at the outlet of the desiccant bed were air temperature 75° F. (23.8° C.), relative humidity 20%–30% and specific humidity 42 grains/lb dry air. After passing through the second heat exchanger 24 the air temperature upstream from the final evaporative chilling step was 69°–70° F. (20.5°–21.1° C.). In the final evaporative chilling step with a controlled fine spray, the final system output air conditions were air temperature in the range of 60°–65° F. (15.5°–18.3° C.) and relative humidity of 40%–50%.

The present invention thus provides the feature and advantage of greater control over the conditioned air parameters by the apparatus arrangements and methods which permit net import of heat energy to and net export of heat energy from the air and moisture flow through the air passageways apparatus and desiccant bed. Thus, for example the 960 BTU's/lb of water of latent heat given up during adsorption and condensation at the extended desiccant material surface area may be conducted through the granules of the desiccant material to the thermally conducting fins or plates for heat exchange and removal with the circulating coolant fluid in the tubes or channels of the desiccant bed for net removal of heat energy from the air and water vapor flow through the air passageways apparatus. The heat removal capacity of the desiccant bed described above with reference to Examples 1 and 2 is for example in the range of 0.1–3 BTU's/second.

While the invention has been described with reference to particular example embodiments, it is intended to cover all variations and equivalents within the scope of the following claims.

I claim:

1. An improved desiccant air conditioning system comprising:
   a heat exchanging desiccant bed comprising desiccant material surfaces defining air passageways through the bed for contacting air in an air flow established through the air passageways with the desiccant material surfaces, and heat transfer liquid circulating channels in heat exchange relationship with the desiccant bed for removing heat energy from the desiccant bed and for adding heat energy too the desiccant bed;
   said desiccant bed comprising parallel plates having heat conducting surfaces and porous desiccant material granules in the granular size range of approximately 1/32 to ¼ inch (0.08 to 0.65 cm) in diameter, intimately bonded to the heat conducting surfaces by an adhesive bonding layer, with the major portion of said granules being exposed for contacting air in the air passageways;
   moisturizing means operatively positioned upstream from the desiccant bed in the air flow of air to be conditioned for moisturizing and cooling air to be conditioned to substantially 100% relative humidity before entering the air passageways of the desiccant bed for enhanced and more efficient utilization of the desiccant bed in conditioning and cooling the air.

2. The desiccant air conditioning system of claim 1 further comprising heat exchange means operatively positioned in the air flow of conditioned air downstream from the desiccant bed, said heat exchange means being operatively coupled to receive cooled circulant for cooling the conditioned air passing from the desiccant bed.

3. The system of claim 1 further comprising adsorb air passageway means for conducting an adsorb air flow, said adsorb air passageway means having an inlet end leading into the desiccant bed and an outlet end leading from the desiccant bed, and air preconditioning means positioned at the inlet end comprising said moisturizing means.

4. The system of claim 3 wherein the air preconditioning means further comprises first heat exchanger means operatively positioned in the adsorb air passageway upstream in the adsorb air flow from the desiccant bed for cooling a circulant in the first heat exchanger and adding heat to air to be conditioned in the adsorb air flow, and a second heat exchanger positioned in the adsorb air passageway downstream in the adsorb air flow from the desiccant bed, said second heat exchanger being operatively coupled to the first heat exchanger for receiving the cooled circulant and cooling conditioned air passing from the desiccant bed.

5. An improved desiccant air coonditioning systems comprising:
   a desiccant bed comprising at least one stack of substantially parallel thermally conducting fins or plates, said plates comprising first and second surfaces respectively facing the surfaces of adjacent plates in the stack, said plates being spaced apart to provide air passageways through the desiccant bed between the plates, said plates comprising tube or circulating channel means for circulating heat transfer liquid in heat exchange relationship with said plates for removing or adding heat;
   a layer of bonding adhesive formed on the surfaces of the respective plates;
   a layer of granular desiccant material intimately bonded to the surfaces of the respective plates by said layer of bonding adhesive, said granular desiccant material comprising substantially spherical silica gel granules in the granular size range of approximately 1/32 to ¼ inch (0.08 to 0.65 cm) in diameter, a major portion of the desiccant material granules being exposed for contacting air passing between said plates; and
   moisturizing means operatively positioned upstream from the desiccant bed in the adsorb cycle air flow for moisturizing and cooling said air to be conditioned to substantially 100% relative humidity for enhanced and more efficient utilization of the desiccant bed in conditioning and cooling the air.

6. The desiccant structure of claim 5 wherein said spheres are bonded to the plates by a layer of bonding adhesive to an extent covering no greater than approximately 20% of the surface area of said spheres.

7. The desiccant structure of claim 5 wherein said plates comprise tube sheets or fins.

8. The desiccant structure of claim 5 wherein said layer of bonding adhesive comprises silicone rubber glue.

9. In a desiccant air conditioning system having a desiccant structure, adsorb cycle means for passing adsorb air to be conditioned through the desiccant structure for drying said air for evaporative cooling, desorb cycle means for reactivating the desiccant structure using desorb air heat energy such as solar energy, the improvement comprising:

a desiccant bed comprising a stack of substantially parallel thermally conducting fins or plates, said plates comprising first and second surfaces respectively facing the surfaces of adjacent plates in the stack, said plates being spaced apart to provide air passageways through the desiccant bed between the plates, said plates comprising tube or circulating channel means for circulating heat transfer liquid in heat exchange relationship with said plates for removing or adding heat;

a layer of bonding adhesive formed on the surfaces of said plates;

a layer of granular desiccant material intimately bonded to the surfaces of the respective plates by said layer of bonding adhesive, a major portion of the desiccant material granules being exposed for contacting air passing between said plates;

desiccant bed circulating means for circulating heat transfer liquid in said channel means for removing heat from the desiccant bed during an adsorb cycle and for adding heat to the desiccant bed during a desorb cycle;

said desiccant bed comprising respective first and second ends for receiving or discharging air, and further comprising adsorb air passageway means communicaitng with the first and second ends of the desiccant bed and a first set of first and second louvers operatively positioned in the adsorb air passageway respectively adjacent to the ends of the desiccant bed, desorb air passageway means operatively communicating with the respective ends of the desiccant bed and a second set of first and second louvers operatively positioned in the desorb air passageway adjacent to the ends of the desiccant bed, and fan means operatively positioned at the adsorb cycle downstream end of the desiccant bed for drawing air through the adsorb air passageway and the desiccant bed during the adsorb cycle, said first set of louvers being operatively positioned in the desorb air passageway for closing the blocking air flow in the desorb air passageway during the adsorb cycle, said fan means being reversible for blowing air through the desiccant bed and desorb air passageway during the desorb cycle; said first set of louvers being operatively positioned in the absorb air passageway for closing during the desorb cycle said second set of louvers being operatively positioned in the desorb air passageway for opening during the desorb cycle.

10. The system of claim 9 further comprising fan means positioned at the adsorb cycle downstream end of the desiccant bed for drawing rather than blowing air through the desiccant bed during the adsorb cycle, said fan means being reversible for blowing air through the desiccant bed during the desorb cycle.

11. The system of claim 9 wherein the adsorb cycle means comprises moisturizing means upstream from the desiccant bed in the adsorb cycle air flow for moisturizing said air to be conditioned to substantially 100% relative humidity.

12. The system of claim 9 wherein the desiccant bed and circulating means are operatively coupled for circulating cooling heat transfer liquid through said channel means during the absorb cycle and for maintaining the desiccant bed substantially in the optimum adsorption temperature range.

13. The system of claim 12 wherein said desiccant bed and circulating means are operatively coupled for maintaining the desiccant bed substantially in the temperature range of 60° to 80° F. (15.5°–26.6° C.).

14. The system of claim 13 further comprising adsorb air passageway means having an inlet end leading into the desiccant bed and an outlet end leading from the desiccant bed, and air reconditioning means positioned in the inlet end for adding heat to the adsorb air to be conditioned prior to entering the desiccant bed, said air preconditioning means also comprising said moisturizing means.

15. The system of claim 14 further comprising spray means operatively positioned in the adsorb air passageway upstream from the adsorb cycle upstream end of the desiccant bed for adding moisture to the air in the adsorb air passageway.

16. The system of claim 15 comprising first heat exchanger means operatively positioned in the adsorb air passageway adjacent to the adsorb cycle upstream end of the desiccant bed for cooling a circulant in the first heat exchanger and adding heat to air in the adsorb air passageway, and a second heat exchanger positioned in the adsorb air passageway at the adsorb cycle downstream end of the desiccant bed, said second heat exchanger operatively coupled to the first heat exchanger for receiving cooled circulant cooling air passing from the desiccant bed.

17. The system of claim 9 further comprising motor means operatively coupled to the fan means for operating the fan means to draw air through the desiccant bed during the adsorb cycle and for reversing the fan and blowing air through the desiccant bed during the desorb cycle.

18. The system of claim 17 wherein said adsorb air passageway comprises a Venturi inlet at the adsorb cycle upstream end of the adsorb air passageway.

19. In a desiccant air conditioning system having a desiccant structure, adsorb cycle means for passing adsorb air to be conditioned through the desiccant structure for drying said air for evaporative cooling during an adsorb cycle, desorb cycle means for reactivating the desiccant structure using desorb air during a desorb cycle, the improvement comprising:

a desiccant bed comprising a stack of substantially parallel heat conducting fins or plates, said plates comprising first and second heat conducting surfaces respectively facing the surfaces of adjacent plates in the stack, said plates being spaced apart to provide air passageways through the desiccant bed between the plates, said plates comprising tube or circulating channel means for circulating heat transfer liquid in heat exchange relationship with said plates for removing or adding heat;

a layer of bonding adhesive formed on the heat conducting surfaces of said plates;

a layer of granular desiccant material intimately bonded to the heat conducting surfaces of the respective plates by said layer of bonding adhesive, said granular desiccant material comprising porous desiccant material granules in the granular size range of 1/32 to ¼ inch (0.08 to 0.65 cm) in diameter, a major portion of the desiccant material granules being exposed for contacting air passing between said plates;

fan means positioned at the adsorb cycle downstream end of the desiccant bed for drawing rather than blowing an adsorb air flow through the desiccant bed during the adsorb cycle, said fan means being reversible for blowing a desorb air flow through the desiccant bed during the desorb cycle;

said adsorb cycle means comprising moisturizing means operatively positioned upstream from the desiccant bed in the adsorb air flow for moisturizing and cooling said air to be conditioned to substantially 100% relative humidity before entering the air passageways through the desiccant bed for enhanced and more efficient utilization of the desiccant bed in conditioning and cooling the air.

20. The system of claim 19 wherein the adsorb cycle means comprises heat exchanger means operatively positioned in the adsorb air flow downstream from the desiccant bed, said heat exchanger being operatively coupled for receiving cooled circulant for cooling the adsorb air flow passing from the desiccant bed.

21. The system of claim 19 comprising first heat exchanger means operatively positioned in the adsorb air passageway upstream in the adsorb air flow from the desiccant bed for cooling a circulant in the first heat exchanger and adding heat to air to be conditioned in the adsorb air flow, and a second heat exchanger positioned in the adsorb air passageway downstream in the adsorb air flow from the desiccant bed, said second heat exchanger being operatively coupled to the first heat exchanger for receiving the cooled circulant and cooling conditioned air passing from the desiccant bed.

22. An improved desiccant air conditioning system comprising:

a heat exchanging desiccant bed comprising desiccant material surfaces defining air passageways through the bed for contacting air in an air flow established through the air passageways with the desiccant material surfaces, and heat transfer liquid circulating channels in heat exchange relationship with the desiccant bed for removing heat energy from the desiccant bed and for adding heat energy too the desiccant bed;

said desiccant bed comprising parallel plates having heat conducting surfaces and porous desiccant material granules in the granular size range of approximately 1/32 to ¼ inch (0.08 to 0.65 cm) in diameter, intimately bonded to the heat conducting surfaces by an adhesive bonding layer, with the major portion of said granules being exposed for contacting air in the air passageways.

23. An improved desiccant air conditioning systems comprising:

a desiccant bed comprising at least one stack of substantially parallel thermally conducting fins or plates, said plates comprising first and second surfaces respectively facing the surfaces of adjacent plates in the stack, said plates being spaced apart to provide air passageways through the desiccant bed between the plates, said plates comprising tube or ciruclating channel means for circulating heat transfer liquid in heat exchange relationship with said plates for removing or adding heat;

a layer of bonding adhesive formed on the surfaces of the respective plates;

and a layer of granular desiccant material intimately bonded to the surfaces of the respective plates by said layer of bonding adhesive, said granular desiccant material comprising substantially spherical silica gel granules in the granular size range of approximately 1/32 to ¼ inch (0.08 to 0.65 cm) in diameter, a major portion of the desiccant material granules being exposed for contacting air passing between said plates; and 24. In a desiccant air conditioning system having a desiccant structure, adsorb cycle means for passing adsorb air to be conditioned through the desiccant structure for drying said air for evaporative cooling during an adsorb cycle, desorb cycle means for reactivating the desiccant structure using desorb air during a desorb cycle, the improvement comprising:

a desiccant bed comprising a stack of substantially parallel heat conducting fins or plates, said plates comprising first and second heat conducting surfaces respectively facing the surfaces of adjacent plates in the stack, said plates being spaced apart to provide air passageways through the desiccant bed between the plates, said plates comprising tube or circulating channel means for circulating heat transfer liquid in heat exchange relationship with said plates for removing or adding heat;

a layer of bonding adhesive formed on the heat conducting surfaces of said plates;

a layer of granular desiccant material intimately bonded to the heat conducting surfaces of the respective plates by said layer of bonding adhesive, said granular desiccant material comprising porous desiccant material granules in the granular size range of 1/32 to ¼ inch (0.08 to 0.65 cm) in diameter, a major portion of the desiccant material granules being exposed for contacting air passing between said plates; and fan means positioned at the adsorb cycle downstream end of the desiccant bed for drawing rather than blowing an adsorb air flow through the desiccant bed during the adsorb cycle, said fan means being reversible for blowing a desorb air flow through the desiccant bed during the desorb cycle.

25. A method for conditioning air using a desiccant air conditioning system comprising:

providing a desiccant bed comprising desiccant material surfaces defining air passsageways, and heat transfer liquid circulating channels in heat exchange relationship with the desiccant bed, said desiccant material surfaces comprising parallel plates having heat conducting surfaces and porous desiccant material granules in the granular size range of approximately 1/32 to ¼ inch (0.08 to 0.65 cm) in diameter, intimately bonded to the heat conducting surfaces by an adhesive bonding layer, with the major portion of said granules being exposed for contacting air in the air passageways;

passing air containing moisture to be absorbed through the air passageways of the desiccant bed during an adsorption cycle;

passing coolant liquid through the circulating channels for removing heat energy from the desiccant bed during the adsorption cycle;

passing heated air through the air passages of the desiccant bed for removing moisture adsorbed on the desiccant material surface thereby recharging the desiccant material during a desorption cycle;

and passing heating liquid through the circulating channels for transferring heat energy to the desiccant bed during the desorption cycle.

26. The method of claim 25 further comprising the step of adding moisture to the air to be conditioned prior to passing the air through the air passageways of the desiccant bed thereby increasing the relative humidity and moisture content of the air prior to adsorption in the desiccant bed.

* * * * *